(12) United States Patent
Kumari et al.

(10) Patent No.: US 11,844,122 B2
(45) Date of Patent: Dec. 12, 2023

(54) VEHICLE-TO-EVERYTHING (V2X) COMMUNICATION TRANSMIT PARAMETER SELECTION USING JOINT COMMUNICATION-RADAR SIDE INFORMATION

(71) Applicant: QUALCOMM Incorporated, San Diego, CA (US)

(72) Inventors: Preeti Kumari, San Diego, CA (US); Kapil Gulati, Belle Mead, NJ (US); Anantharaman Balasubramanian, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/393,321

(22) Filed: Aug. 3, 2021

(65) Prior Publication Data

US 2023/0043235 A1 Feb. 9, 2023

(51) Int. Cl.
*H04W 76/14* (2018.01)
*H04W 4/40* (2018.01)
(Continued)

(52) U.S. Cl.
CPC .......... *H04W 76/14* (2018.02); *G01S 13/931* (2013.01); *H04B 7/01* (2013.01); *H04L 1/0001* (2013.01); *H04W 4/40* (2018.02); *H04W 72/046* (2013.01)

(58) Field of Classification Search
CPC .......... G01S 13/931; G01S 2013/9316; G01S 2013/9323; G01S 2013/9324;
(Continued)

(56) References Cited

U.S. PATENT DOCUMENTS 9,312,929 B2 * 4/2016 Forenza .................... H04B 7/01
10,476,631 B2 * 11/2019 Williams ............ H04L 27/2649
(Continued)

FOREIGN PATENT DOCUMENTS

RU 2308736 C1 * 10/2007

OTHER PUBLICATIONS

Blinokhvatov et al., "Device for Selection of Interfering Relections from Optically Unobservable Objects ('Angels')," English Translation of Blinokhvatov et al. (RU 2308736 C1), Patent Translate, Espacenet Patent Search, Aug. 1, 2023, pp. 1-8 (Year: 2023).*
(Continued)

*Primary Examiner* — Thomas R Cairns
(74) *Attorney, Agent, or Firm* — Seyfarth Shaw, LLP

(57) ABSTRACT

A method of wireless communication by a first user equipment (UE) includes receiving a vehicle-to-everything (V2X) message from a second UE. The method also includes periodically transmitting and receiving a radar signal to sense an environment of the first UE. The method includes estimating joint communication and radar side information based on the V2X message and the radar signal. The method further includes predicting a communication state between the first UE and the second UE based on the joint communication and radar side information. The method still further includes updating communication transmit parameters based on the communication state.

12 Claims, 11 Drawing Sheets

(51) Int. Cl.
*G01S 13/931* (2020.01)
*H04B 7/01* (2006.01)
*H04W 72/044* (2023.01)
*H04L 1/00* (2006.01)

(58) Field of Classification Search
CPC ...... G01S 2013/9325; G01S 2013/9314–9329;
H04B 7/01; H04B 7/0617; H04B 7/0619;
H04B 7/0695; H04B 7/088; H04L
1/0001; H04L 1/0005; H04L 5/0044;
H04L 5/1438; H04L 12/40136; H04L
1/0003–0005; H04L 52/04; H04W 8/005;
H04W 4/40–48; H04W 28/00; H04W
28/22; H04W 40/12; H04W 52/04; H04W
72/046; H04W 76/04; H04W 76/14;
H04W 84/18; H04W 88/04; H04W 16/18;
H04W 72/14
See application file for complete search history.

(56) References Cited

U.S. PATENT DOCUMENTS

| | | | |
|---|---|---|---|
| 2019/0181916 A1* | 6/2019 | Rofougaran | H02J 50/50 |
| 2020/0007247 A1 | 1/2020 | Gulati et al. | |
| 2020/0235997 A1* | 7/2020 | Shimizu | H04L 41/0896 |
| 2021/0101612 A1 | 4/2021 | Hall et al. | |

OTHER PUBLICATIONS

Dayal A., et al., "Adaptive Semi-Persistent Scheduling for Enhanced On-Road Safety in Decentralized V2X Networks", Arxiv.Org, Cornell University Library, 201 OLIN Library Cornell University Ithaca, NY 14853, Apr. 5, 2021, 9 Pages, XP081932323.

International Search Report and Written Opinion—PCT/US2022/039049—ISA/EPO—dated Nov. 21, 2022.

* cited by examiner

VEHICLE-TO-EVERYTHING (V2X) COMMUNICATION TRANSMIT PARAMETER SELECTION USING JOINT COMMUNICATION-RADAR SIDE INFORMATION

FIELD OF THE DISCLOSURE

The present disclosure relates generally to wireless communications, and more specifically to vehicle-to-everything (V2X) communication transmit parameter selection using joint communication-radar side information.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related cellular communications systems (e.g., cellular vehicle-to-everything (CV2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipment (UEs), such as vehicles, may communicate directly with each other using device-to-device (D2D) communications over a D2D wireless link. These communications can be referred to as sidelink communications.

As the demands for sidelink communications increase in general, and CV2X technology specifically penetrates the market and the number of cars supporting CV2X communication grows rapidly, the CV2X network is expected to become increasingly crowded, especially for peak traffic scenarios. As a result, the chance of colliding allocations between UEs may increase. An allocation collision may prevent successful decoding of at least one of the colliding UE transmissions and in some cases may prevent all of the colliding UE transmissions from being decoded. For safety reasons, there is a need to minimize the duration of repetitive collisions between semi-persistently scheduled allocations of colliding user equipment (UEs) or to minimize the number of future collisions in general.

SUMMARY

In aspects of the present disclosure, a method of wireless communication by a first user equipment (UE) includes receiving a vehicle-to-everything (V2X) message from a second UE. The method also includes periodically transmitting and receiving a radar signal to sense an environment of the first UE. The method also includes estimating joint communication and radar side information based on the V2X message and the radar signal. The method further includes predicting a communication state between the first UE and the second UE based on the joint communication and radar side information. The method still further includes updating communication transmit parameters based on the communication state.

Other aspects of the present disclosure are directed to an apparatus for wireless communication by a first user equipment (UE) having a memory and one or more processors coupled to the memory. The processor(s) is configured to receive a vehicle-to-everything (V2X) message from a second UE. The processor(s) is also configured to periodically transmit and receive a radar signal to sense an environment of the first UE. The processor(s) is also configured to estimate joint communication and radar side information based on the V2X message and the radar signal. The processor(s) is further configured to predict a communication state between the first UE and the second UE based on the joint communication and radar side information. The processor(s) is still further configured to update communication transmit parameters based on the communication state.

Other aspects of the present disclosure are directed to an apparatus for wireless communication by a first user equipment (UE) including means for receiving a vehicle-to-everything (V2X) message from a second UE. The apparatus also includes means for periodically transmitting and receiving a radar signal to sense an environment of the first UE. The apparatus also includes means for estimating joint communication and radar side information based on the V2X message and the radar signal. The apparatus further includes means for predicting a communication state between the first UE and the second UE based on the joint communication and radar side information. The apparatus still further includes means for updating communication transmit parameters based on the communication state.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
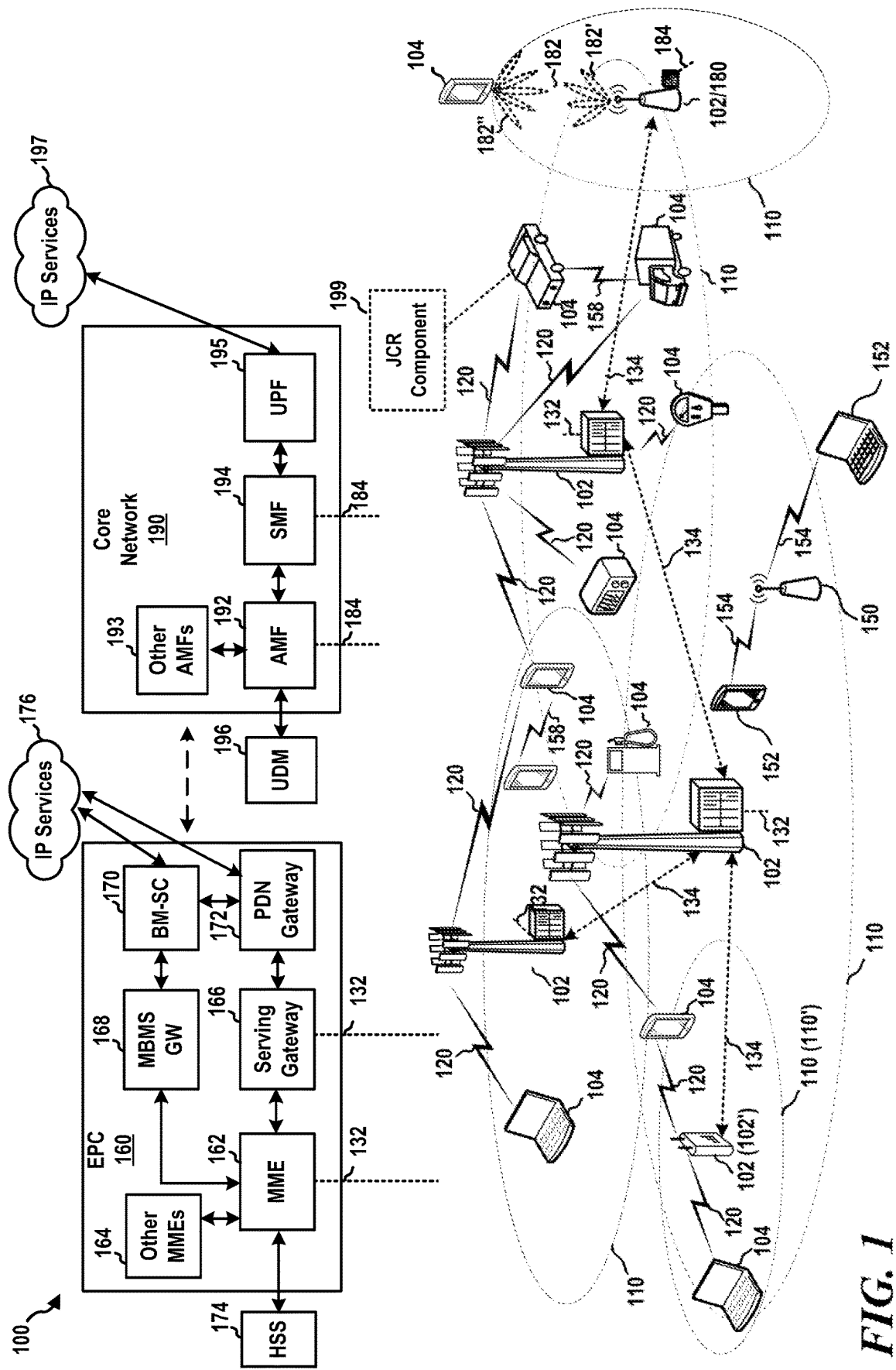
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UE) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a BS and a UE. For instance, the PSCCH may carry sidelink control information (SCI) and the PSCCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial internet of things (IIoT), and/or NR-lite.

Conventionally, when a first user (e.g., user-A) transmits messages to a second user (e.g., user-B) for high-data rate vehicular applications, user-A may experience reduced communication capability. For example, intermittent outages may be experienced. The reduced communication capability may be due to vehicular mobility and/or blockage of the communication path between vehicles. In order to enable robust and efficient communication, user-A performs additional training for beamforming and communication channel sensing, which creates additional overhead and decreases the communication data rate.

According to aspects of the present disclosure, user-A may communicate in a robust, efficient manner with a high-data rate with user-B's vehicular applications, while reducing the need for additional training overhead. User-A may adaptively select transmit parameters using joint communication-radar (JCR) side information. Additionally, user-A may obtain the JCR side information by associating and correlating its radar side information with (vehicle-to-everything) V2X messages received from user-B. The V2X messages received from user-B may include personal safety messages (PSMs) and basic safety messages (BSMs) to potentially enhance safety as well as traffic efficiency. User-A and user-B can be vehicles or vulnerable road users (VRUs). Pedestrians, bicyclists, and road construction crew are examples of VRUs. Devices at user-A and user-B may include cell phones, vehicle/bike mounted hardware, and construction equipment, for example.

Using radar as a coarse estimate for selecting suitable communication transmit parameters may lead to a reduction in communication training overhead, where the communication training may be directed to finding the best beam and waveform parameters. After the coarse estimate is received from radar, communication can further optimize the best beamforming shape and gain if needed. Therefore, the communication data rate may improve and outages may be reduced.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may adjust communication transmit parameters based on joint communication-radar (JCR) side information. The UE 104 may include a JCR component 199 configured to receive a vehicle-to-everything (V2X) message from a second UE and periodically transmit and receive a radar signal to sense an environment of the first UE. The JCR component 199 is also configured to estimate joint communication and radar side information based on the V2X message and the radar signal, predict a communication state between the first UE and the second UE based on the joint communication and radar side information, and update communication transmit parameters based on the communication state.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \mu p*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
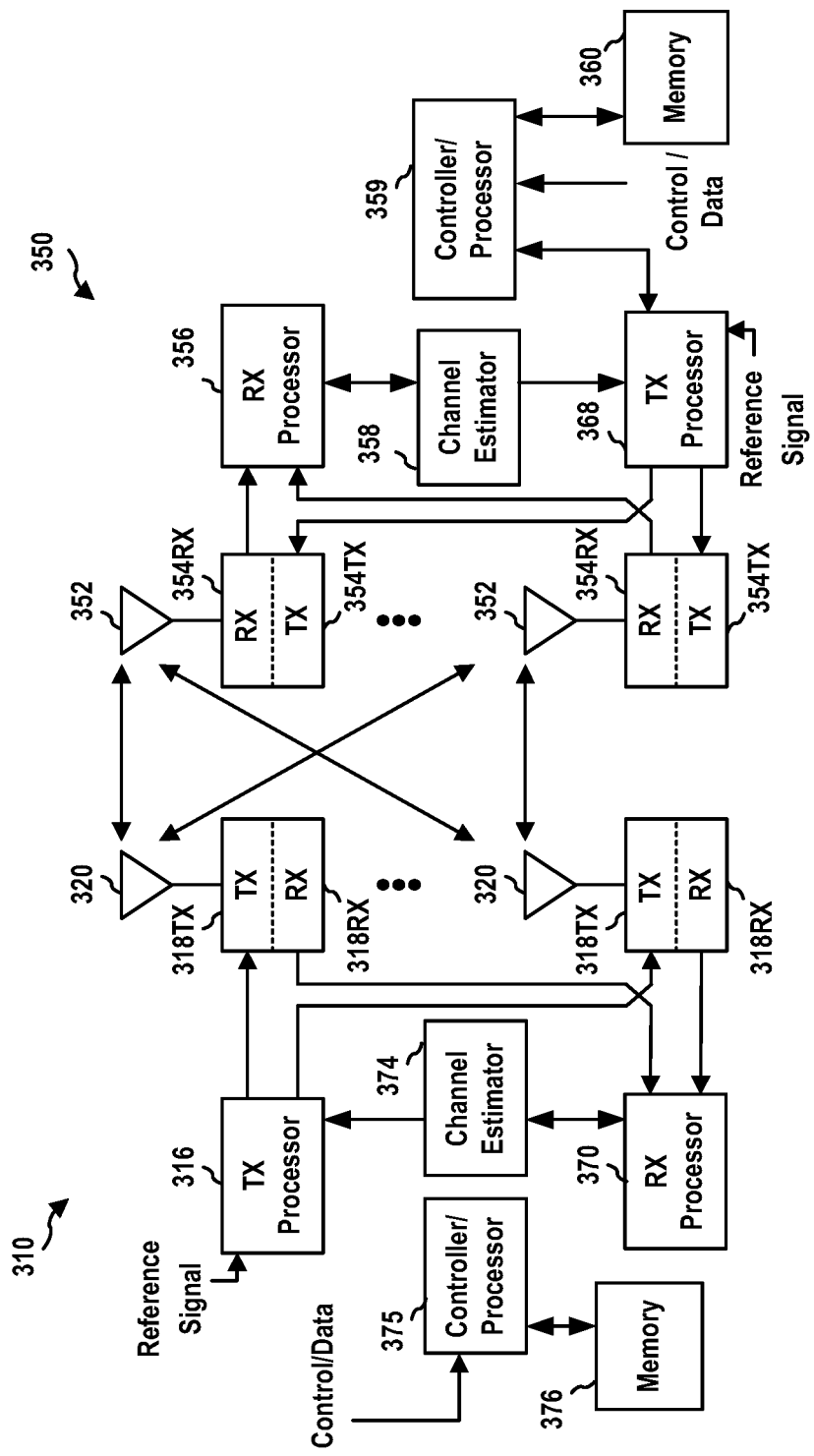
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the JCR component 199 of FIG. 1. In some aspects, the UE 104, 350 may include means for receiving, means for transmitting, means for estimating, means for predicting, means for updating, means for adjusting, and/or means for determining. Such means may include one or more components of the UE 104, 350 described in connection with FIGS. 1 and 3.

Figure 4:
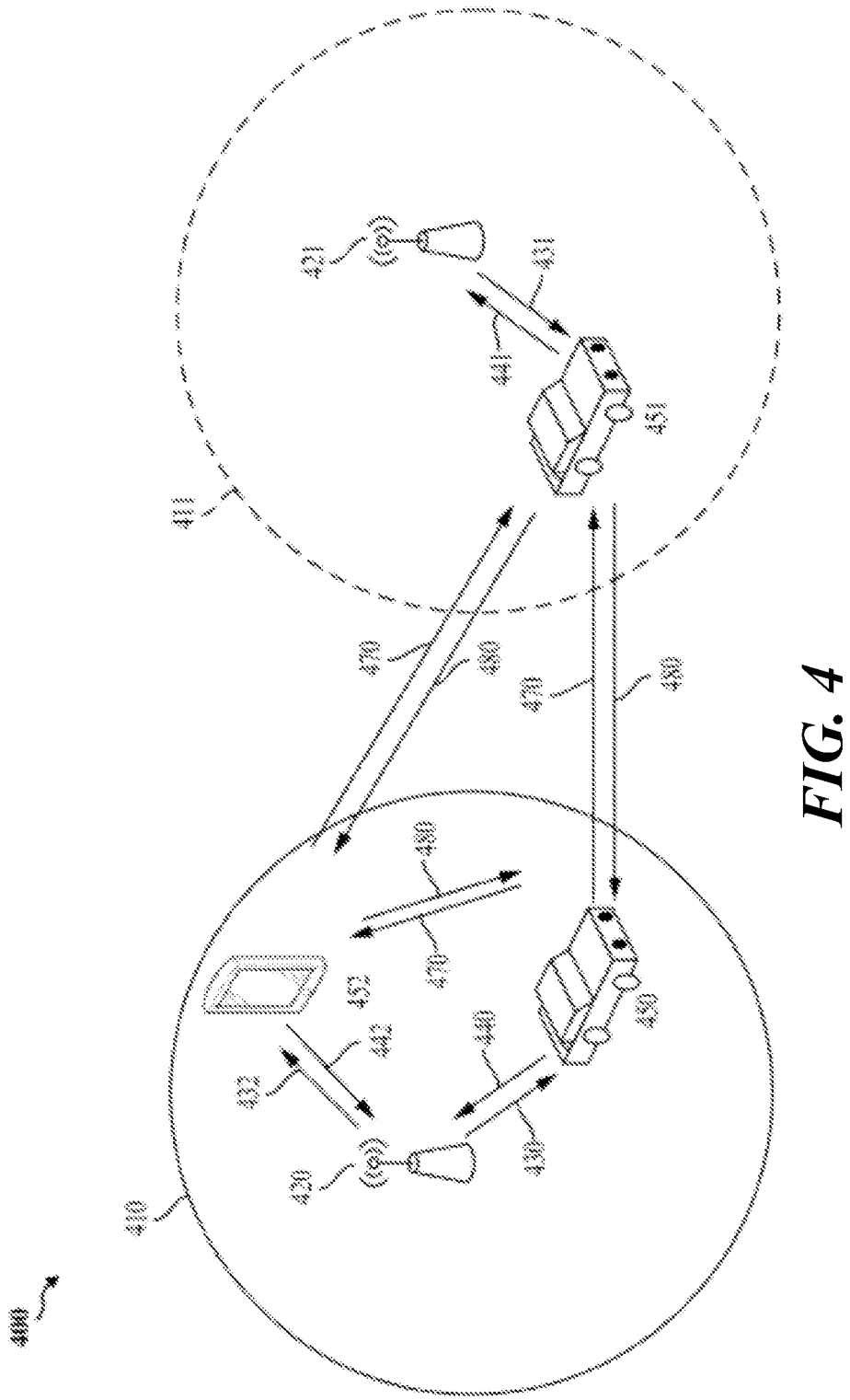
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
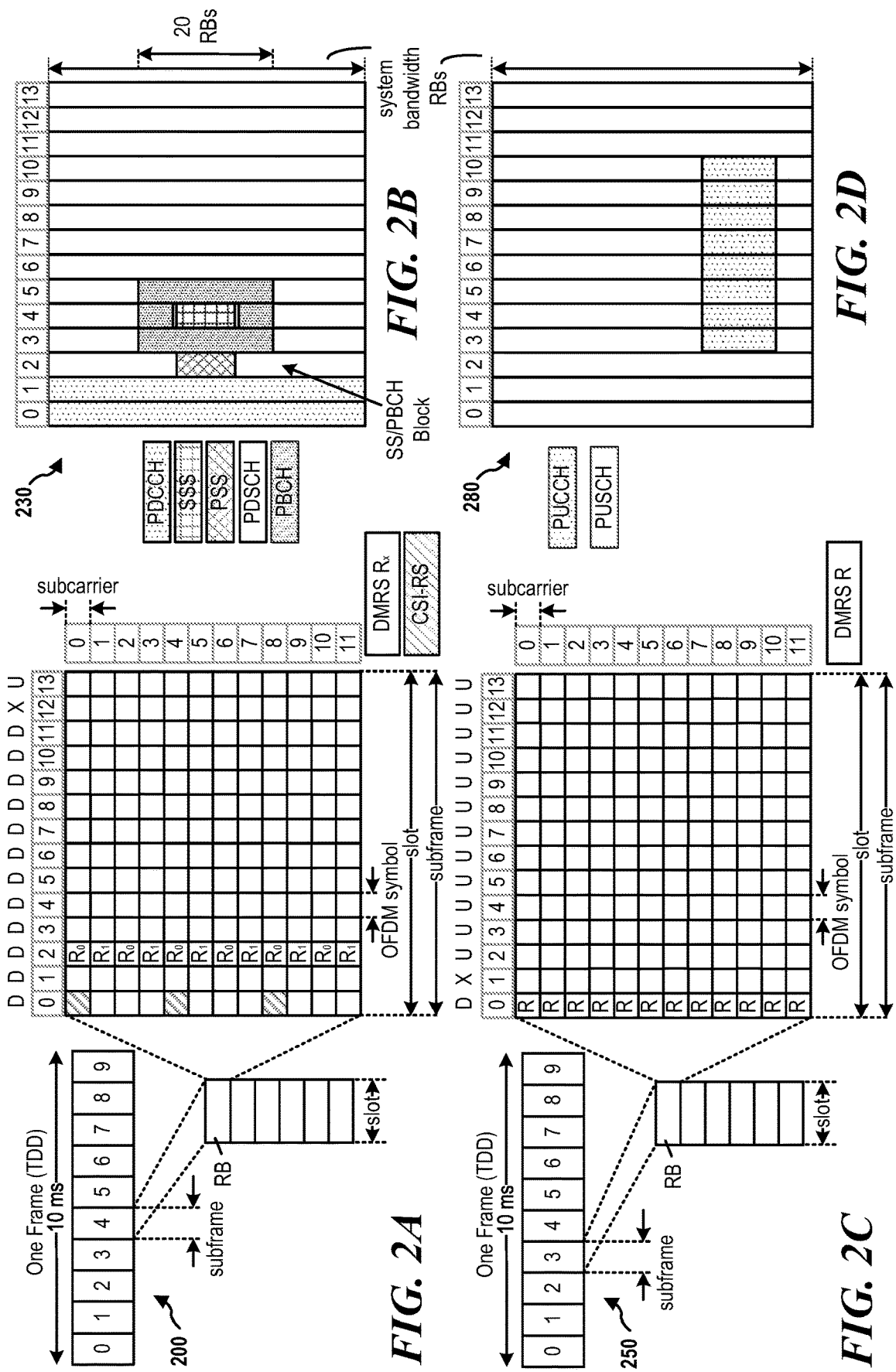
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
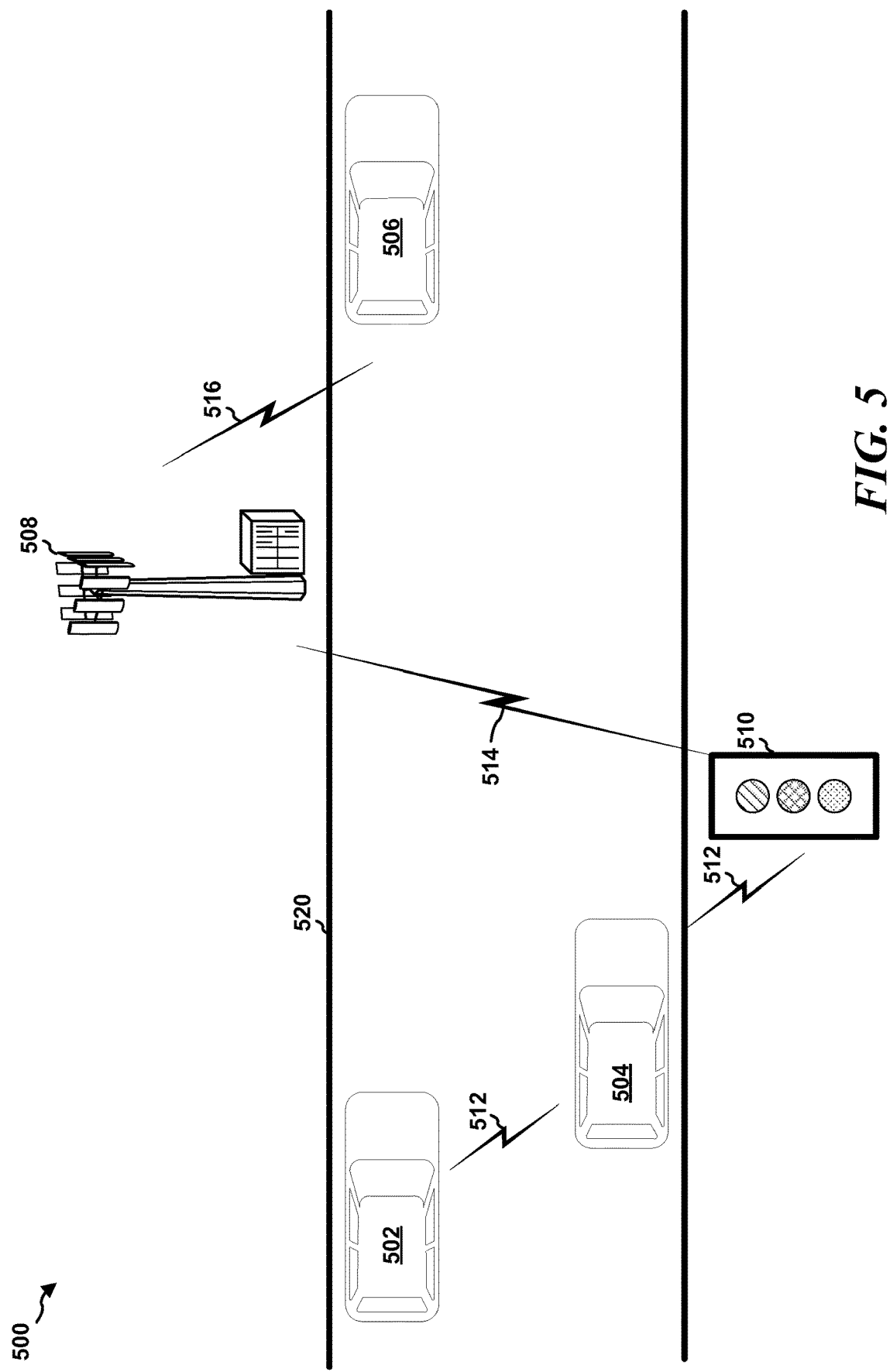
FIG. 5 is a block diagram illustrating an example of a vehicle-to-everything (V2X) system with a road side unit (RSU), according to aspects of the present disclosure.

FIG. 5 illustrates an example of a vehicle-to-everything (V2X) system with a roadside unit (RSU), according to aspects of the present disclosure. As shown in FIG. 5, V2X system 500 includes a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
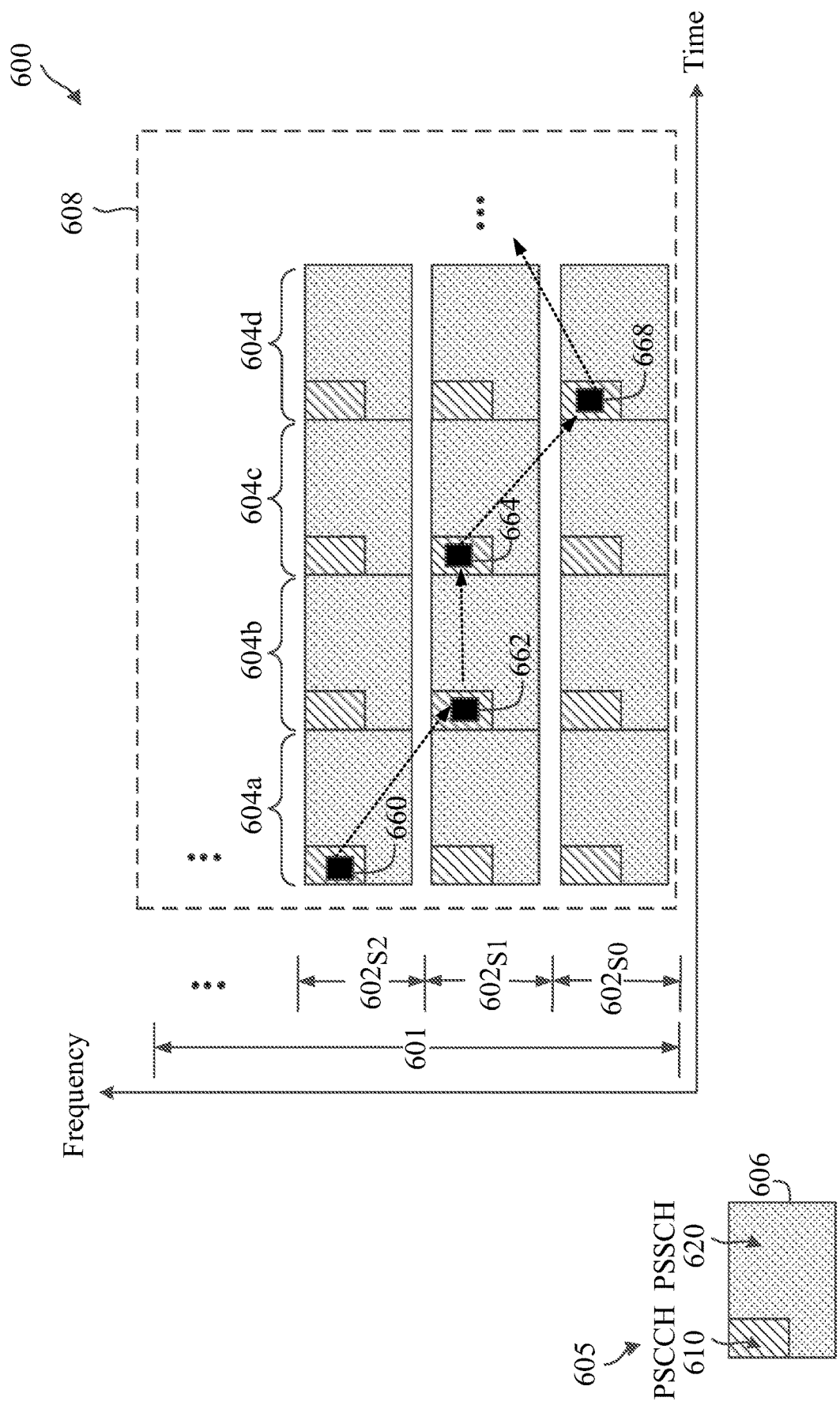
FIG. 6 is a graph illustrating a sidelink (SL) communications scheme, in accordance with various aspects of the present disclosure.

FIG. 6 is a graph illustrating a sidelink (SL) communications scheme, in accordance with various aspects of the present disclosure. A scheme 600 may be employed by UEs such as the UEs 104 in a network such as the network 100. In FIG. 6, the x-axis represents time and the y-axis represents frequency. The CV2X channels may be for 3GPP Release 16 and beyond.

In the scheme 600, a shared radio frequency band 601 is partitioned into multiple subchannels or frequency subbands 602 (shown as $602_{S0}$, $602_{S1}$, $602_{S2}$) in frequency and multiple sidelink frames 604 (shown as 604a, 604b, 604c, 604d) in time for sidelink communications. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. The PSCCH 610 may be for part one of a control channel (CCH), with the second part arriving as a part of the shared channel allocation. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 606.

In an NR sidelink frame structure, the sidelink frames 604 in a resource pool 608 may be contiguous in time. A sidelink UE (e.g., the UEs 104) may include, in SCI 660, a reservation for a sidelink resource 606 in a later sidelink frame 604. Thus, another sidelink UE (e.g., a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband $602_{S2}$ to reserve a sidelink resource 606 in a next sidelink frame 604b located at the frequency subband $602_{S1}$. Similarly, during the sidelink frame 604b, the sidelink UE transmits SCI 662 in the sidelink resource 606 located in the frequency subband $602_{S1}$ to reserve a sidelink resource 606 in a next sidelink frame 604c located at the frequency subband 602S1. During the sidelink frame 604c, the sidelink UE transmits SCI 664 in the sidelink resource 606 located in the frequency subband $602_{S1}$ to reserve a sidelink resource 606 in a next sidelink frame 604d located at the frequency subband $602_{S0}$. During the sidelink frame 604d, the sidelink UE transmits SCI 668 in the sidelink resource 606 located in the frequency subband $602_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (e.g., via frequency division multiplexing (FDM)). For instance, in the sidelink frame 604b, one pair of sidelink UEs may communicate sidelink data using a sidelink resource 606 in the frequency subband $602_{S2}$ while another pair of sidelink UEs may communicate sidelink data using a sidelink resource 606 in the frequency subband 602si.

In some aspects, the scheme 600 is used for synchronous sidelink communications. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 608 in the frequency band 601, for example, while in coverage of a serving BS. The resource pool 608 may include a plurality of sidelink resources 606. The BS can configure the sidelink UE with a resource pool configuration indicating resources in the frequency band 601 and/or the subbands 602 and/or timing information associated with the sidelink frames 604. In some aspects, the scheme 600 includes mode-2 radio resource allocation (RRA) (e.g., supporting autonomous RRA that can be used for out-of-coverage sidelink UEs or partial-coverage sidelink UEs).

As described above, a first user (e.g., user-A) may transmit messages to a second user (e.g., user-B) for high-data rate vehicular applications, such as a raw sensing data exchange or collaborative virtual reality gaming. In some examples, user-A may experience reduced communication capability based on transmitting the messages to user-B. For example, user-A may experience intermittent outages. The reduced communication capability may be due to vehicular mobility and/or blockage of the communication path between vehicles. In order to enable robust and efficient communication, user-A performs additional training for beamforming and communication channel sensing, which creates additional overhead and decreases the communication data rate.

According to aspects of the present disclosure, user-A may perform high-data rate communications with user-B's vehicular applications in a robust and efficient manner, while reducing the need for additional training overhead. User-A may adaptively select transmit parameters using joint communication-radar (JCR) side information. Additionally, user-A may obtain the JCR side information by associating and correlating its radar side information with vehicle-to-everything (V2X) messages received from user-B.

In some examples, user-A may receive V2X messages from user-B. The V2X messages received from user-B may include a personal safety message (PSM) and a basic safety message (BSM) to potentially enhance safety as well as traffic efficiency. User-A and user-B can be vehicles or vulnerable road users (VRUs). Pedestrians, bicyclists, and road construction crews are examples of VRUs. Devices at user-A and user-B may include cell phones, vehicle/bike mounted hardware, and construction equipment, for example.

Figure 7:
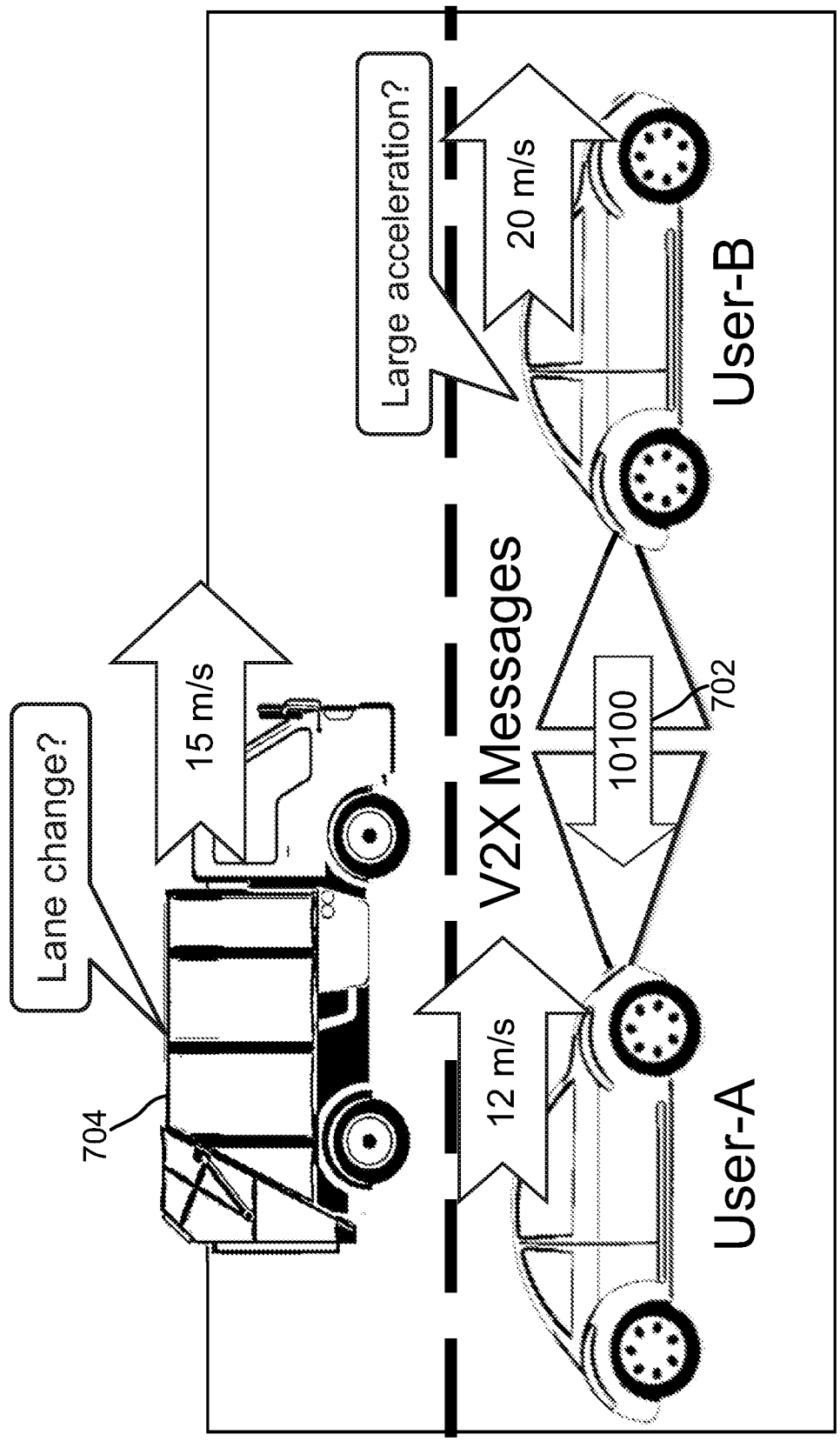
FIG. 7 is a block diagram illustrating vehicle-to-everything (V2X) communication, in accordance with various aspects of the present disclosure.

FIG. 7 is a block diagram illustrating vehicle-to-everything (V2X) communication, in accordance with various aspects of the present disclosure. In FIG. 7, user-B transmits a V2X message 702 to user-A. In the example of FIG. 7, the V2X message 702 is a binary message with the content 10100. As shown in the example of FIG. 7, user-A is travelling at 12 m/s, user-B is travelling at 20 m/s, and a third vehicle 704 is travelling at 15 m/s. The third vehicle 704 may not support V2X communication. In the example of FIG. 7, one or more events may affect a communication link between user-A and user-B. As an example, the third vehicle 704 may possibly change lanes and position itself between user-A and user-B, which would block the communication link between user-A and user-B. As another example, user-B may accelerate, which may negatively affect the communication link between user-A and user-B.

The V2X message 702 may contain one or more data fields, such as, three dimensional (3D) location information, direction heading, acceleration, velocity, personal crossing in progress, path history, path prediction, user type, size, behavior, personal assistive device information, public safety and road worker activity, future intentions, and signal-to-noise ratio at the communication receiver of user-B. The one or more data fields of the V2X message 702 may be updated at a limited rate due to the limited transmission rate of the V2X message 702. The 3D location information may be provided by a global positioning system (GPS). In some examples, the 3D location information may not be accurate, for example, due to the movement of user-B. The future intentions data field may indicate a personal crossing request or lane change request, for example.

In the example of FIG. 7, a communication receiver at user-A receives V2X messages 702 from user-B to announce the presence of user-B and provide details about the future intentions of user-B. As noted above, the third vehicle 704 may possibly initiate a lane change maneuver, disrupting a communication link between user-A and user-B. The disruption to the communication link may limit user-A's knowledge of present and future one-way bi-static channel state information (CSI). A line-of-sight (LoS) link may be an example of a communication link.

Figure 8:
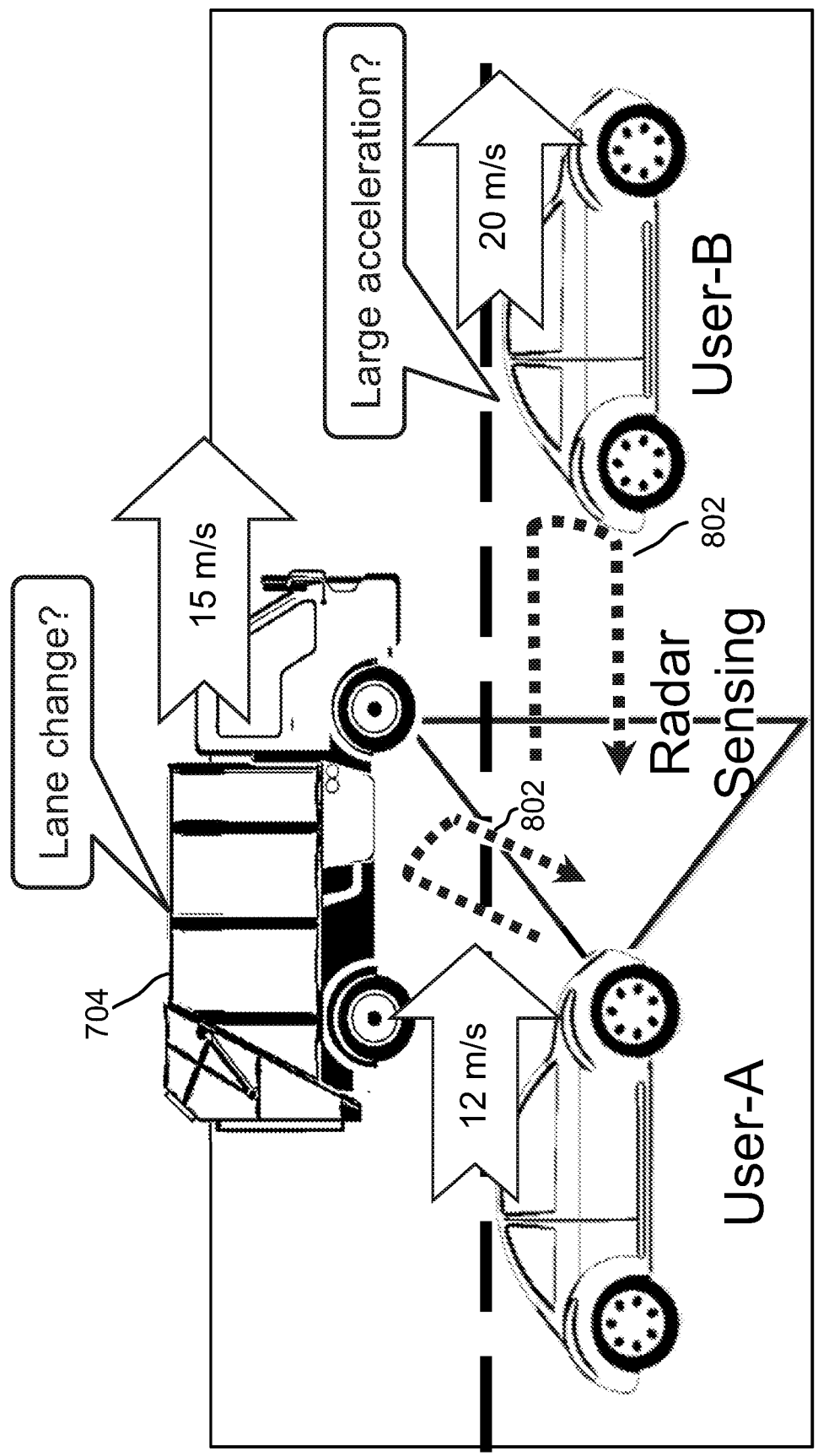
FIG. 8 is a block diagram illustrating radar sensing, in accordance with various aspects of the present disclosure.

In some examples, user-A may have radar detection and estimation capabilities. FIG. 8 is a block diagram illustrating radar sensing, in accordance with various aspects of the present disclosure. In the example of FIG. 8, user-A employs radar to sense the environment to enable safety and comfort features, such as collision avoidance and adaptive cruise control. The radar periodically transmits a radar signal 802 to sense the environment. The sensing occurs with a high update rate. The radar signal 802 is reflected by surrounding objects (e.g., the third vehicle 704 and user-B) and the echoes are received at the radar receiver in a full-duplex configuration. The received signal is then processed to estimate the two-way monostatic channel parameters at user-A. In FIG. 8, user-A senses user-B and the third vehicle 704 with the radar signals 802.

Radar may estimate various target parameters, such as range profile, velocity profile, angular profile, radar signature, target tracking, target behavior and path prediction. The velocity profile may be estimated for non-rigid objects, such as bicycles and pedestrians. The velocity profile may also provide micro-Doppler characteristics. The radar signature may enable target classification, and estimate a target shape and size.

In FIG. 8, a radar receiver at user-A transmits a radar signal 802 and receives echoes of the radar signal 802 from surrounding vehicles (e.g., the third vehicle 704 and user-B) to estimate the two-way monostatic channel parameters at a high update rate. The radar receiver processes the estimated channel to characterize the state, tracking information, and prediction behavior of the relevant targets. The position and velocity estimation accuracies are high due to the wide available bandwidths, use of antenna arrays, and long coherent processing interval. However, radar suffers from poor data association and has limited sensing capability when there is a blockage.

As described, user-A transmits communication messages to user-B for high-data rate vehicular applications, such as raw sensing data exchange or collaborative virtual reality gaming. User-A may transmit its signal at a millimeter wave (mmWave) band (for example, 73 GHz) with a high bandwidth (for example, 2 GHz) to achieve a high-data rate (a few Gb/s). However, user-A's communication capability may be reduced due to vehicular mobility, communication link blockage, and accelerations from surrounding vehicles, such as user-B. To enable robust and efficient communication, user-A performs additional training for beamforming and communication channel sensing. This training and sensing, however, adds additional overhead and decreases the communication data rate.

Aspects of the present disclosure are directed to a robust, efficient, and high-data rate solution for communications from user-A to user-B's in vehicular applications. Aspects of the present disclosure may also reduce the need for additional training overhead. According to aspects of the present disclosure, user-A adaptively selects transmit parameters using joint communication-radar (JCR) side information. User-A may obtain this JCR side information by associating and correlating its radar side information with the V2X messages received from user-B.

Figure 9:
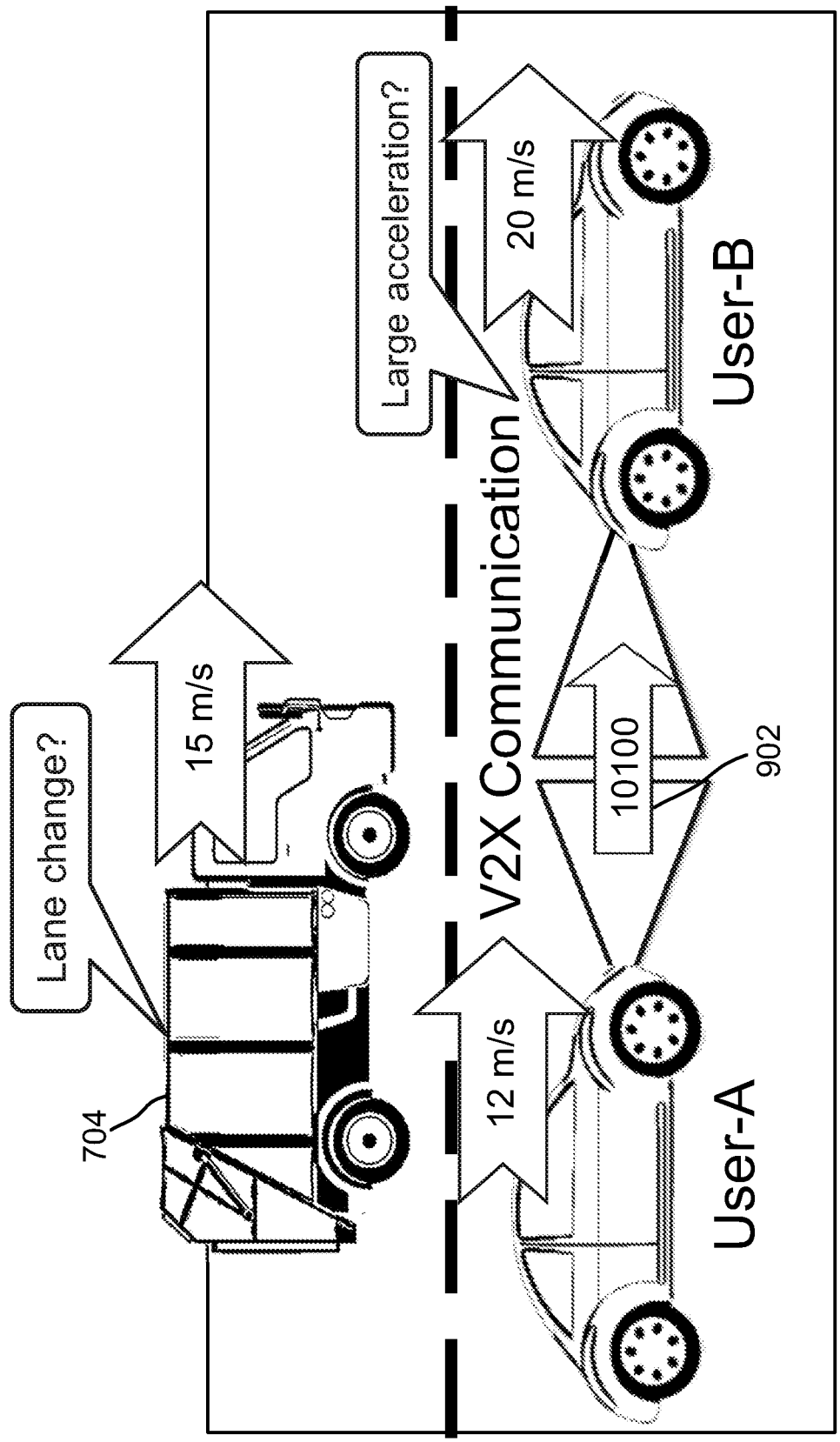
FIG. 9 is a block diagram illustrating V2X communication, in accordance with various aspects of the present disclosure.

FIG. 9 is a block diagram illustrating V2X communication, in accordance with various aspects of the present disclosure. In the example of FIG. 9, a communication transmitter at user-A sends a communication message 902 to user-B for high-data rate applications, such as vehicular applications. As described, the third vehicle 704 may not support V2X communication. Additionally, in the example of FIG. 9, one or more events may affect a communication link between user-A and user-B. As an example, the third vehicle 704 may possibly initiate a lane change maneuver and position itself between user-A and user-B, thereby disrupting the line-of-sight (LoS) link (e.g., communication link) between user-A and user-B. As another example, user-B may also begin to accelerate away from user-A, which may cause a poor communication link with user-B. Aspects of the present disclosure address these potential communication issues, in addition to other types of communication issues.

Figure 10:
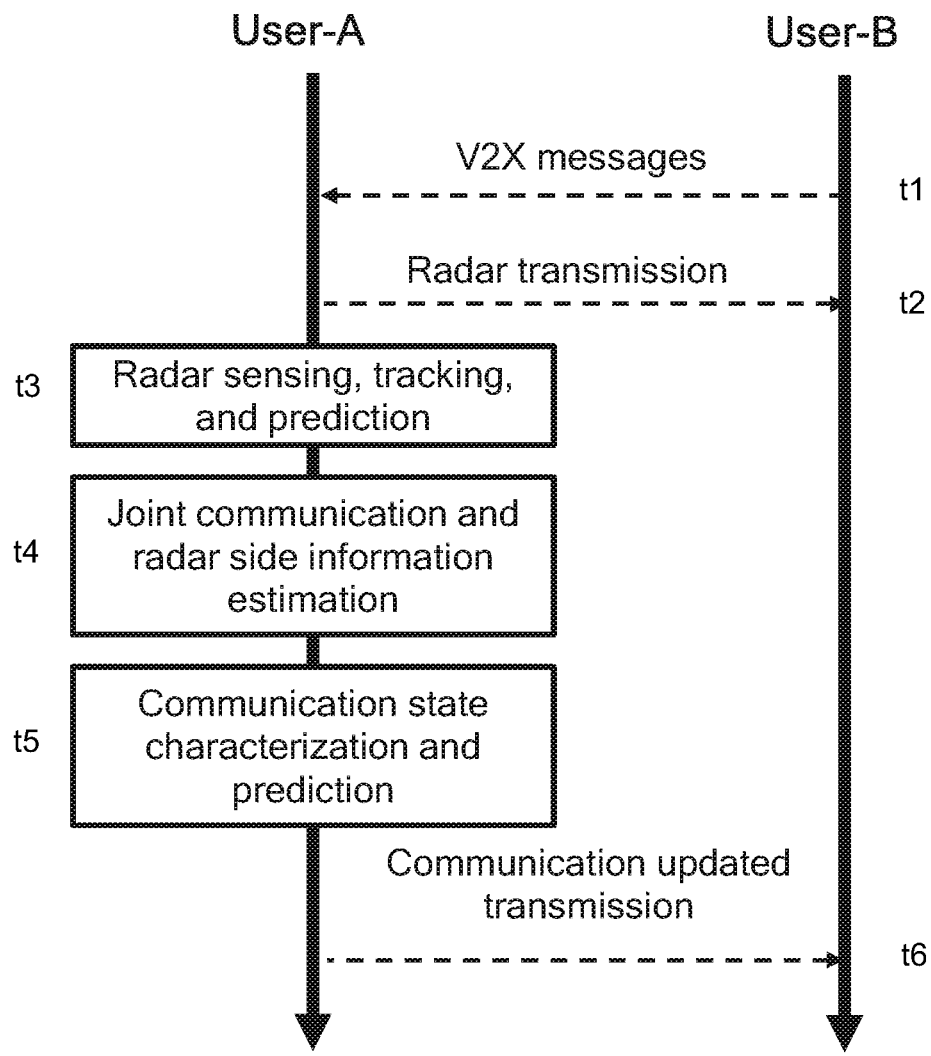
FIG. 10 is a call flow diagram illustrating communication transmit parameter selection, in accordance with various aspects of the present disclosure.

FIG. 10 is a call flow diagram illustrating communication transmit parameter selection, in accordance with various aspects of the present disclosure. At time t1, user-A receives V2X messages from user-B to announce the presence of user-B, as well as future intentions of user-B. The V2X messages may be periodically received by user-A. The messages are received at a low update rate. At time t2, user-A periodically transmits a radar signal to sense the environment for safety and comfort features. The radar signals may be transmitted at a high update rate. At time t3, user-A processes the radar echoes to estimate channel sensing parameters, to perform target tracking, and to predict a path/behavior of detected objects.

At time t4, user-A estimates JCR side information by finding an association and correlation between the radar information and the received V2X messages. Based on the JCR side information, at time t5 user-A characterizes and predicts the communication state. The communication state may include, for example, a type of communication link, channel delay, Doppler information, and angular spread estimates. At time t6, user-A may optimize and update its communication transmit parameters based on the communication state characterization and prediction. These parameters may include, for example, beamforming and waveform parameters.

Joint communication-radar (JCR) side information will now be discussed in more detail. JCR information may also be referred to as RADCOM or joint radar and communication, or collocated and cooperative radar and communication information. There are similarities and dissimilarities between the radar side information and the received V2X messages. The radar side information may be based on the two-way monostatic radar channel state. The V2X messages may provide limited information on its present and future one-way bi-static channel state and user behavior. JCR side information may be obtained by determining an association and correlation between the parameters estimated by radar and the information communicated by user-B in V2X messages.

JCR side-information may contain estimated parameters for the surrounding objects, including user-B, such as location and heading estimates, velocity and acceleration profile estimates, and object signature, such as object type (e.g., pedestrian, vehicle, bicycle), orientation, size and shape, tracking, and predicted behavior. The JCR information may also contain estimated parameters for presence of blockage between the object and user-A, feasibility of a line-of-sight (LoS) link in the near future, and possible scattering clusters that might be used in non-LoS scenarios for reflecting the signals to user-B. The JCR side-information may also provide a confidence measure for the previously mentioned estimated parameters.

As noted above, V2X messages received from user-B at user-A contain limited information on the present and future one-way bi-static channel state. Radar sensing enables better estimation of user-B's location and motion profile. Additionally, radar sensing increases an update rate of the estimates based on the radar's high update rate. Radar sensing may also estimate the radar parameters for the third vehicle 704 (FIG. 8) with no V2X support.

According to aspects of the present disclosure, where there is no blockage between user-A and user-B, user-A receives V2X communication side information from user-B with location estimates and future intentions of user-B. User-A transmits the radar signal and receives echoes from surrounding objects, including a LoS reflection from user-B. The radar may perform detection, estimation, tracking, and behavior prediction of surrounding objects.

Based on the similar location parameters obtained from V2X messages and radar side information, user-A associates the relevant target echo detected in the radar channel with user-B. Additionally, an estimated radar signature can be correlated with the typical radar signature of user-B, based on the information received from V2X messages, to increase the confidence level in the LoS association to user-B. For example, micro-Doppler characteristics may help identify users such as a bicycle or pedestrian, which may be confirmed from the user type data field in the V2X messages.

In this example, user-A characterizes the communication link between user-A and user-B as line-of-sight (LoS). User-A also predicts the feasibility of a communication LoS link based on JCR side information. If the prediction indicates a LoS link is feasible, the transmitter at user-A selects a narrow beam width pointing towards user-B. The transmitter may also be configured with a smaller cyclic prefix, and/or a higher modulation and coding scheme (MCS) level to increase the communication data rate.

If the prediction indicates the LoS link is not feasible, but there is a non-LoS (NLoS) path, user-A finds relevant scatters to bounce-off the signals to user-B among all the targets estimated by the radar. A communication transmitter of user-A may adapt its beamforming parameters, such as beam width and shape depending on the current LoS and predicted NLoS communication channel state. The transmitter may also be configured with an increased cyclic prefix length, decreased MCS level, and increased transmit power to enable robust and efficient communication for an NLoS path.

More detail will now be presented for when a blockage occurs between user-A and user-B. In this example, user-A receives V2X communication side information with location information and future intentions of user-B. The radar may sense its channel but user-A is unable to associate any of its detected LoS target echoes with user-B based on the joint communication-radar (JCR) side information. The channel may be indicated as NLoS when there is no association between radar target locations and the location of user-B. In this case, the NLoS scenario observed by the radar may be used to provide a coarse estimate of suitable transmit power, beamforming shape and gain, beam width, cyclic prefix length, and MCS level to enable robust and efficient NLoS communication with reduced outage.

Based on possible correlations between radar data and received V2X messages, user-A uses the radar side information to locate candidate targets of interest that could be used to reflect the signals from the communication transmitter at user-A to the communication receiver at user-B. These possible targets of interest for communication purposes may be obtained by finding the scatters that have a high bi-static reflection coefficient and small path loss. The candidate targets may also be selected based on current location estimates. For example, detected radar targets that fall in-between the locations of user-A and user-B may be chosen. User-B's current location and predicted behavior may be communicated via V2X messages.

In some aspects of the present disclosure, the target list may be pruned and optimized based on the user type, current activity, and future intentions of user-B, received from V2X messages. As an example, a flat surface such as the side of a car may be used to reflect signals to user-B with a straight path, whereas a circular surface such as the corner of the car may be used to reflect the signal when user-B is making a turn.

The reflection target may be selected based on tracking information and predicted behavior of both the users. For example, the location, speed and heading information, and predicted behavior information for user-B provided by V2X messages along with the radar targets tracking and predicted behavior estimation may be considered. The detected radar targets with a predicted path falling in-between the two users for a long duration may be preferred. Those radar targets that are predicted to take a turn (when both the users are travelling straight) may not be considered.

Other factors for pruning include the amplitude of the target scattering clusters. For example, the dominant scatters/scattering clusters in the monostatic radar channel may be selected for reflecting signals to the communication receiver. This will enable exploiting some of the similarities between the monostatic radar reflectivity and bi-static communication reflectivity of a scatter. For example, a metallic surface has high reflectivity and a pedestrian has low reflectivity in both monostatic radar and bi-static communication channels.

Other factors for pruning include the range, Doppler characteristics, and angular spread associated with the targets. For example, large surfaces will generally have high range/Doppler/angular spread and may provide robustness for NLoS communication.

Additional factors for pruning include the bi-static radar cross section (RCS). For example, if there is a large flat surface (such as the side of a car or truck) detected by the radar between the two users without blocking the path, then the large flat surface may be used for reflecting the signal to the communication receiver mounted on user-B, which is travelling straight (as communicated by V2X messages). The large flat surface has a high bi-static RCS.

According to aspects of the present disclosure, after selecting a reflecting target, the communication transmitter of user-A adapts its beamforming parameters, such as beam width and shape depending on the predicted NLoS communication channel state including the selected targets for reflecting the signal. The transmitter may also be configured to increases the cyclic prefix length, decrease the MCS level, and/or increase the transmit power to enable robust and efficient communication.

If the targets are widely separated and the communication receiver is far away, then a multi-beam may be preferred. If the targets are closely separated and the communication receiver is near, then a single broad beam may be used. If radar observes a dense NLoS scenario, the communication transmitter may increase the cyclic prefix length, decrease the MCS level, and/or increase the transmit power for enhanced communication.

In further aspects of the present disclosure, user-A estimates the Doppler-shift profile of a LoS communication channel. In these aspects, user-A receives V2X communication side information with location information and future intentions of user-B. User-A transmits its radar signal and receives echoes from surrounding objects, including a LoS reflection from user-B. The radar also performs detection, estimation, tracking, and behavior prediction of surrounding objects. Similar to other aspects of the disclosure, user-A associates the relevant target detected in the radar channel with user-B and thus characterizes and predicts the communication link between user-A and user-B as line-of-sight (LoS). User-A may also estimate and predict a Doppler-shift profile of the LoS communication channel based on radar data and V2X messages.

If the radar estimates a high Doppler shift and high Doppler spread for the target corresponding to communication with user-B, the communication transmitter may reduce its frame length, use a moderate beam width (meaning neither too narrow nor too wide), and change its waveform parameters. For example, the transmitter may be configured to increase a subcarrier spacing in orthogonal frequency division multiplexing (OFDM), or use a different waveform that is more robust. If the radar estimates low Doppler shift and low Doppler spread for the target corresponding to communication with user-B, the communication transmitter may increase its frame length, use a narrow beam, and change its waveform parameters such as reducing subcarrier spacing in OFDM.

Using radar as a coarse estimate for selecting suitable communication transmit parameters may reduce communication training overhead, where the communication training is directed to finding the best beam and waveform parameters. After the coarse estimate is received from radar, communication can further optimize the best beamforming shape and gain if needed. Therefore, the communication data rate improves and outages may be reduced.

As indicated above, FIGS. 7-10 are provided as examples. Other examples may differ from what is described with respect to FIGS. 7-10.

Figure 11:
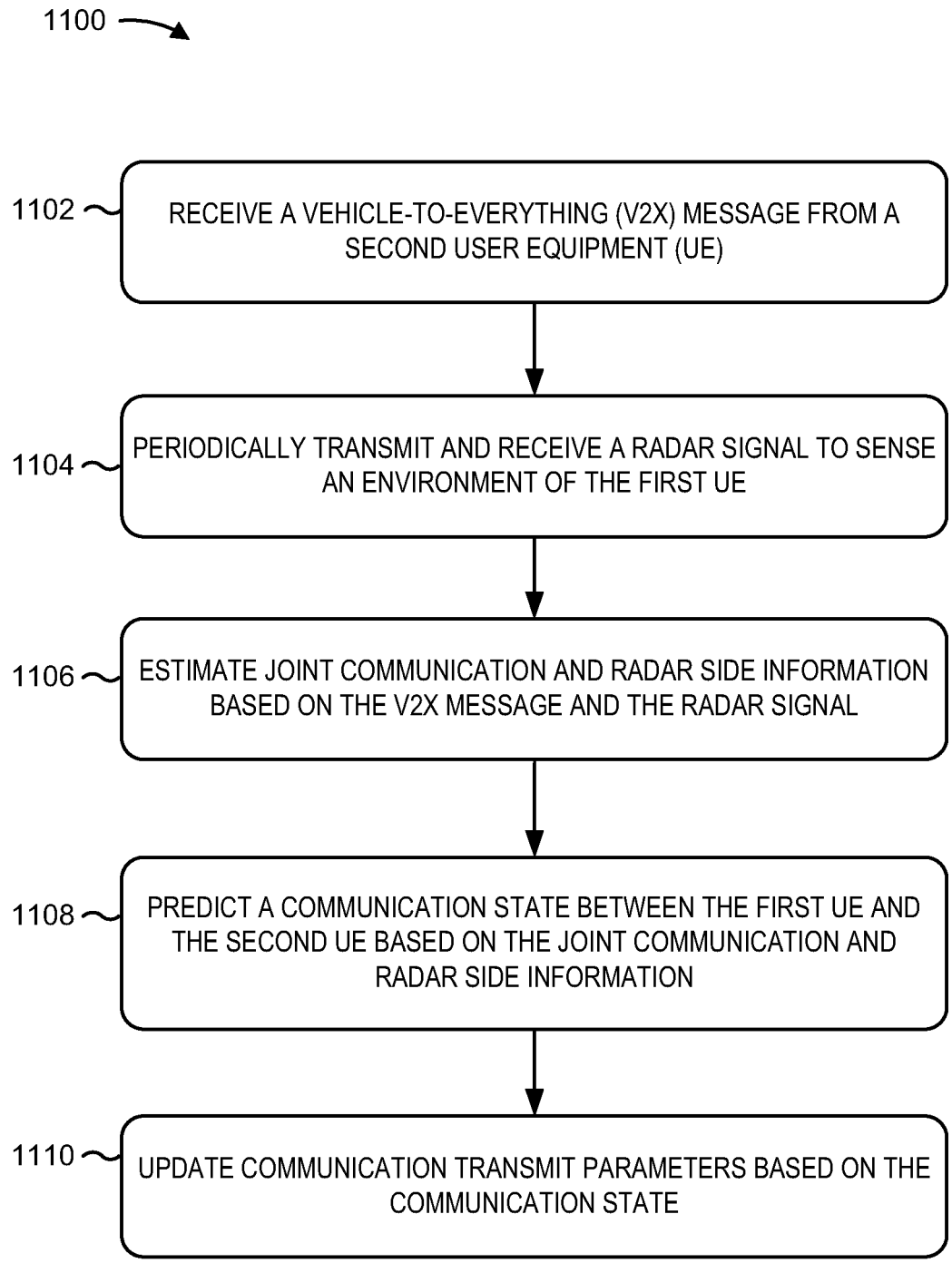
FIG. 11 is a flow diagram illustrating an example process performed, for example, by a user equipment, in accordance with various aspects of the present disclosure.

FIG. 11 is a flow diagram illustrating an example process 1100 performed, for example, by a user equipment, in accordance with various aspects of the present disclosure. The example process 1100 is an example of a vehicle-to-everything (V2X) communication transmit parameter selection using joint communication-radar side information. The operations of the process 1100 may be implemented by a UE 104.

At block 1102, the user equipment (UE) receives a vehicle-to-everything (V2X) message from a second UE. For example, the UE (e.g., using the antenna 352, receive processor 356, receiver 354, controller/processor 359, and/or memory 360) may receive the message. The message may announce the presence of the second UE, as well as future intentions of the second UE. The message may be received at a low update rate.

At block 1104, the user equipment (UE) periodically transmits and receives a radar signal to sense an environment of the first UE. For example, the UE (e.g., using the antenna 352, receive processor 356, transmit processor 368, Rx/Tx 354, controller/processor 359, and/or memory 360) may transmit and receive the radar signal. The radar signals may be transmitted and received at a high update rate.

At block 1106, the user equipment (UE) estimates joint communication and radar side information based on the V2X message and the radar signal. For example, the UE (e.g., using memory 360, and/or controller/processor 359) may estimate the joint communication and radar (JCR) side information. JCR information may also be referred to as RADCOM or joint radar and communication, or collocated and cooperative radar and communication information. At block 1108, the user equipment (UE) predicts a communication state between the first UE and the second UE based on the joint communication and radar side information. For example, the UE (e.g., using memory 360, and/or controller/processor 359) may predict the communication state. The communication state may include a line of sight path or a non-line of sight path between the first UE and the second UE.

At block 1110, the user equipment (UE) updates communication transmit parameters based on the communication state. For example, the UE (e.g., using memory 360, and/or controller/processor 359) may update the communication transmit parameters. The communication transmit parameters may configure a beam pointing towards the second UE, and may configure a decreased cyclic prefix (CP) length, and/or an increased modulation and coding scheme (MCS) when the path is line of sight. The communication transmit parameters may configure a beam pointing towards a target for reflecting towards the second UE, and may configure an increased cyclic prefix (CP) length, and/or an decreased modulation and coding scheme (MCS) when the path is non-line of sight.

Implementation examples are described in the following numbered clauses.

1. A method of wireless communication by a first user equipment (UE), comprising:
    receiving a vehicle-to-everything (V2X) message from a second UE;
    periodically transmitting and receiving a radar signal to sense an environment of the first UE;
    estimating joint communication and radar side information based on the V2X message and the radar signal;
    predicting a communication state between the first UE and the second UE based on the joint communication and radar side information; and
    updating communication transmit parameters based on the communication state.
2. The method of clause 1, in which the communication state includes a line of sight path between the first UE and the second UE, and the communication transmit parameters configure a beam pointing towards the second UE.
3. The method of clause 1 or 2, in which the communication transmit parameters configure at least one of a decreased cyclic prefix (CP) length, or an increased modulation and coding scheme (MCS).
4. The method of any of the preceding clauses, in which the beam has a narrow beam width.
5. The method of any of the preceding clauses, further comprising:
    estimating a Doppler shift associated with the line of sight path based on the V2X message and the radar signal; and
    adjusting the communication transmit parameters based on the Doppler shift.
6. The method of clause 1, in which the communication state includes a non-line of sight path between the first UE and the second UE, and the communication transmit parameters configure a beam pointing towards a target for reflecting to the second UE.

7. The method of any of the clauses 1 or 6, in which the communication transmit parameters configure at least one of an increased transmission power, an increased cyclic prefix (CP) length, or a decreased modulation and coding scheme (MCS).

8. The method of any of the clauses 1, 6, or 7, in which the beam has a wide beam width.

9. The method of any of the clauses 1, 6, 7, or 8, further comprising determining the target from a plurality of candidate targets based on at least one of: a current location of the second UE, a predicted behavior of the second UE, a current location of the first UE, a path loss between the first UE and each of the plurality of candidate targets, a path loss between the second UE and each of the plurality of candidate targets, or a reflection coefficient of each of the plurality of candidate targets.

10. The method of any of the clauses 1, 6, 7, 8, or 9, further comprising selecting the target from a plurality of candidate targets based on at least one of: a type of the second UE, an activity of the second UE, an activity of the first UE, a type of the first UE, a range of each of the plurality of candidate targets, a Doppler shift associated with each of the plurality of candidate targets, or an angular spread associated with each of the plurality of candidate targets.

11. An apparatus for wireless communication by a first user equipment (UE), comprising:
    a memory; and
    at least one processor coupled to the memory, the at least one processor configured:
        to receive a vehicle-to-everything (V2X) message from a second UE;
        to periodically transmit and receive a radar signal to sense an environment of the first UE;
        to estimate joint communication and radar side information based on the V2X message and the radar signal;
        to predict a communication state between the first UE and the second UE based on the joint communication and radar side information; and
        to update communication transmit parameters based on the communication state.

12. The apparatus of clause 11, in which the communication state includes a line of sight path between the first UE and the second UE, and the communication transmit parameters configure a beam pointing towards the second UE.

13. The apparatus of clause 11 or 12, in which the communication transmit parameters configure at least one of a decreased cyclic prefix (CP) length, or an increased modulation and coding scheme (MCS).

14. The apparatus of any of the clauses 11-13, in which the beam has a narrow beam width.

15. The apparatus of any of the clauses 11-14, in which the at least one processor is further configured:
    to estimate a Doppler shift associated with the line of sight path based on the V2X message and the radar signal; and
    to adjust the communication transmit parameters based on the Doppler shift.

16. The apparatus of any of the clause 11, in which the communication state includes a non-line of sight path between the first UE and the second UE, and the communication transmit parameters configure a beam pointing towards a target for reflecting to the second UE.

17. The apparatus of any of the clauses 11 or 16, in which the communication transmit parameters configure at least one of an increased transmission power, an increased cyclic prefix (CP) length, or a decreased modulation and coding scheme (MCS).

18. The apparatus of any of the clauses 11 or 16-17, in which the beam has a wide beam width.

19. The apparatus of any of the clauses 11 or 16-18, in which the at least one processor is further configured to determine the target from a plurality of candidate targets based on at least one of: a current location of the second UE, a predicted behavior of the second UE, a current location of the first UE, a path loss between the first UE and each of the plurality of candidate targets, a path loss between the second UE and each of the plurality of candidate targets, or a reflection coefficient of each of the plurality of candidate targets.

20. The apparatus of any of the clauses 11 or 16-19, in which the at least one processor is further configured to select the target from a plurality of candidate targets based on at least one of: a type of the second UE, an activity of the second UE, an activity of the first UE, a type of the first UE, a range of each of the plurality of candidate targets, a Doppler shift associated with each of the plurality of candidate targets, or an angular spread associated with each of the plurality of candidate targets.

21. An apparatus for wireless communication by a first user equipment (UE), comprising:
    means for receiving a vehicle-to-everything (V2X) message from a second UE;
    means for periodically transmitting and receiving a radar signal to sense an environment of the first UE;
    means for estimating joint communication and radar side information based on the V2X message and the radar signal;
    means for predicting a communication state between the first UE and the second UE based on the joint communication and radar side information; and
    means for updating communication transmit parameters based on the communication state.

22. The apparatus of clause 21, in which the communication state includes a line of sight path between the first UE and the second UE, and the communication transmit parameters configure a beam pointing towards the second UE.

23. The apparatus of clause 21 or 22, in which the communication transmit parameters configure at least one of a decreased cyclic prefix (CP) length, or an increased modulation and coding scheme (MCS).

24. The apparatus of any of the clauses 21-23, in which the beam has a narrow beam width.

25. The apparatus of any of the clauses 21-24, further comprising:
    means for estimating a Doppler shift associated with the line of sight path based on the V2X message and the radar signal; and
    means for adjusting the communication transmit parameters based on the Doppler shift.

26. The apparatus of clause 21, in which the communication state includes a non-line of sight path between the first UE and the second UE, and the communication transmit parameters configure a beam pointing towards a target for reflecting to the second UE.

27. The apparatus of any of the clauses 21 or 26, in which the communication transmit parameters configure at least one of an increased transmission power, an increased cyclic prefix (CP) length, or a decreased modulation and coding scheme (MCS).

28. The apparatus of any of the clauses 21 or 26-27, in which the beam has a wide beam width.

29. The apparatus of any of the clauses 21 or 26-28, further comprising means for determining the target from a plurality of candidate targets based on at least one of: a current location of the second UE, a predicted behavior of the second UE, a current location of the first UE, a path loss between the first UE and each of the plurality of candidate targets, a path loss between the second UE and each of the plurality of candidate targets, or a reflection coefficient of each of the plurality of candidate targets.

30. The apparatus of any of the clauses 21 or 26-29, further comprising means for selecting the target from a plurality of candidate targets based on at least one of: a type of the second UE, an activity of the second UE, an activity of the first UE, a type of the first UE, a range of each of the plurality of candidate targets, a Doppler shift associated with each of the plurality of candidate targets, or an angular spread associated with each of the plurality of candidate targets.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a first user equipment (UE), comprising:
    receiving a vehicle-to-everything (V2X) message from a second UE; periodically transmitting and receiving a radar signal to sense an environment of the first UE;
    estimating joint communication and radar side information based on the V2X message and the radar signal;
    predicting a communication state between the first UE and the second UE based on the joint communication and radar side information, the communication state including a non-line of sight path between the first UE and the second UE; and
    updating communication transmit parameters to configure a beam pointing towards a target of a plurality of targets for reflecting to the second UE based on the communication state, the communication transmit parameters configuring an increased transmission power and an increased cyclic prefix (CP) length.

2. The method of claim 1, in which the communication transmit parameters configure a decreased modulation and coding scheme (MCS).

3. The method of claim 1, further comprising determining the target from the plurality of candidate targets based on at least one of: a current location of the second UE, a predicted behavior of the second UE, a current location of the first UE, a path loss between the first UE and each of the plurality of candidate targets, a path loss between the second UE and each of the plurality of candidate targets, or a reflection coefficient of each of the plurality of candidate targets.

4. The method of claim 1, further comprising selecting the target from the plurality of candidate targets based on at least one of: a type of the second UE, an activity of the second UE, an activity of the first UE, a type of the first UE, a range of each of the plurality of candidate targets, a Doppler shift associated with each of the plurality of candidate targets, or an angular spread associated with each of the plurality of candidate targets.

5. An apparatus for wireless communication by a first user equipment (UE), comprising:
    a memory; and
    at least one processor coupled to the memory, the at least one processor configured:
        to receive a vehicle-to-everything (V2X) message from a second UE;
        to periodically transmit and receive a radar signal to sense an environment of the first UE;
        to estimate joint communication and radar side information based on the V2X message and the radar signal;

to predict a communication state between the first UE and the second UE based on the joint communication and radar side information, the communication state including a non-line of sight path between the first UE and the second UE; and to update communication transmit parameters to configure a beam pointing towards a target of a plurality of targets for reflecting to the second UE based on the communication state, the communication transmit parameters configuring an increased transmission power and an increased cyclic prefix (CP) length.

6. The apparatus of claim 5, in which the communication transmit parameters configure a decreased modulation and coding scheme (MCS).

7. The apparatus of claim 5, in which the at least one processor is further configured to determine the target from the plurality of candidate targets based on at least one of: a current location of the second UE, a predicted behavior of the second UE, a current location of the first UE, a path loss between the first UE and each of the plurality of candidate targets, a path loss between the second UE and each of the plurality of candidate targets, or a reflection coefficient of each of the plurality of candidate targets.

8. The apparatus of claim 5, in which the at least one processor is further configured to select the target from the plurality of candidate targets based on at least one of: a type of the second UE, an activity of the second UE, an activity of the first UE, a type of the first UE, a range of each of the plurality of candidate targets, a Doppler shift associated with each of the plurality of candidate targets, or an angular spread associated with each of the plurality of candidate targets.

9. An apparatus for wireless communication by a first user equipment (UE), comprising:
means for receiving a vehicle-to-everything (V2X) message from a second UE;
means for periodically transmitting and receiving a radar signal to sense an environment of the first UE;
means for estimating joint communication and radar side information based on the V2X message and the radar signal;
means for predicting a communication state between the first UE and the second UE based on the joint communication and radar side information, the communication state including a non-line of sight path between the first UE and the second UE; and
means for updating communication transmit parameters to configure a beam pointing towards a target of a plurality of targets for reflecting to the second UE based on the communication state, the communication transmit parameters configuring an increased transmission power and an increased cyclic prefix (CP) length.

10. The apparatus of claim 9, in which the communication transmit parameters configure a decreased modulation and coding scheme (MCS).

11. The apparatus of claim 9, further comprising means for determining the target from the plurality of candidate targets based on at least one of: a current location of the second UE, a predicted behavior of the second UE, a current location of the first UE, a path loss between the first UE and each of the plurality of candidate targets, a path loss between the second UE and each of the plurality of candidate targets, or a reflection coefficient of each of the plurality of candidate targets.

12. The apparatus of claim 9, further comprising means for selecting the target from the plurality of candidate targets based on at least one of: a type of the second UE, an activity of the second UE, an activity of the first UE, a type of the first UE, a range of each of the plurality of candidate targets, a Doppler shift associated with each of the plurality of candidate targets, or an angular spread associated with each of the plurality of candidate targets.

\* \* \* \* \*